United States Patent
Kim et al.

(10) Patent No.: US 8,941,602 B2
(45) Date of Patent: Jan. 27, 2015

(54) DISPLAY DEVICE HAVING TOUCH SENSOR AND METHOD FOR DRIVING THE SAME

(75) Inventors: Sung-Chul Kim, Gyeonggi-do (KR);
Chang-Su Kyeong, Daegu (KR);
Dae-Jin Myoung, Gyeonggi-do (KR);
Dae-Kyu Yi, Gyeonggi-do (KR);
Sung-Ho Kim, Gyeonggi-do (KR);
Seung-Rok Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 433 days.

(21) Appl. No.: 13/226,887

(22) Filed: Sep. 7, 2011

(65) Prior Publication Data

US 2012/0056834 A1    Mar. 8, 2012

(30) Foreign Application Priority Data

Sep. 7, 2010  (KR) .......................... 10-2010-0087638

(51) Int. Cl.
*G06F 3/041*  (2006.01)
*G06F 3/044*  (2006.01)
*G09G 3/36*   (2006.01)
*G02F 1/1333* (2006.01)

(52) U.S. Cl.
CPC .............. *G06F 3/0418* (2013.01); *G06F 3/044* (2013.01); *G09G 3/3648* (2013.01); *G09G 2300/0434* (2013.01); *G09G 2310/08* (2013.01); *G09G 2330/06* (2013.01); *G02F 1/13338* (2013.01)
USPC .......................................... 345/173; 345/156

(58) Field of Classification Search
CPC .............. G02F 1/13338; G06F 3/0418; G09G 2300/0434; G09G 2310/08; G09G 2330/06; G09G 3/3648
USPC ..................................................... 345/156–173
See application file for complete search history.

(56) References Cited

U.S. PATENT DOCUMENTS

| | | | | |
|---|---|---|---|---|
| 2009/0202002 | A1* | 8/2009 | Yao et al. ...................... | 375/254 |
| 2010/0110040 | A1* | 5/2010 | Kim et al. ..................... | 345/174 |
| 2011/0057890 | A1* | 3/2011 | Goo et al. ..................... | 345/173 |

FOREIGN PATENT DOCUMENTS

| | | |
|---|---|---|
| CN | 1503118 A | 6/2004 |
| TW | 201023129 A1 | 6/2010 |
| TW | 201030585 A1 | 8/2010 |

OTHER PUBLICATIONS

CN Office Action dated Dec. 4, 2013.
TIPO—Office Action for Taiwanese Patent Application No. 100131777—Issued on Mar. 24, 2014—Including English Translation.

* cited by examiner

*Primary Examiner* — Viet Pham
(74) *Attorney, Agent, or Firm* — Morgan, Lewis & Bockius LLP (57) ABSTRACT

The present invention relates to a display device having a touch sensor in which the touch sensor is driven in a period which has a small noise component from the display device to reduce influence from the noise for minimizing a touch error; and a method for driving the same.

The display device having a touch sensor includes a display panel, a panel driving unit for driving the display panel, a timing controller for controlling driving timing of the panel driving unit, a touch sensor integrated with the display panel attached thereto or built therein, and a touch controller for driving the touch sensor in a no noise period excluding a period in which the noise is generated periodically from the display panel by using at least one synchronizing signal from the timing controller, and calculating touch coordinates from a signal from the touch sensor and forwarding the touch coordinates.

15 Claims, 8 Drawing Sheets

Signal Level - Average 829    Noise Level - Max 79

FIG. 11B

Signal Level - Average 996    Noise Level - Max 17

DISPLAY DEVICE HAVING TOUCH SENSOR AND METHOD FOR DRIVING THE SAME

CROSS REFERENCE TO RELATED APPLICATION

This application claims the benefit of the Patent Korean Application No. 10-2010-0087638, filed on Sep. 7, 2010, which is hereby incorporated by reference as if fully set forth herein.

BACKGROUND OF THE DISCLOSURE

1. Field of the Disclosure

The present invention relates to display devices, and more particularly to a display device having a touch sensor in which influence of noise from a display device is reduced for minimizing a touch error; and a method for driving the same.

2. Discussion of the Related Art

These days, the touch sensor which can input information by touching a screen of various display devices is widely applied to a computer system as an information input device. Since the touch sensor enables a user to move or select displayed information by simple touch of the screen with a finger or a stylus s, everybody can use the touch sensor, easily.

The touch sensor provides touch information by sensing a touch and a touch position on the screen of the display device, and the computer system analyzes the touch information to carry out an order. As the display device, flat display devices, such as liquid crystal display devices, plasma display panels, organic luminescence diode display device, and the like are used, mostly.

Depending on sensing principles, in touch sensing technologies, there are a resistance film type, a capacitive type, optical type, an infrared rays type, an ultrasonic type, and an electro-magnetic type.

The resistance film type touch sensor perceives the touch by sensing a change of voltage taken place as upper and lower resistance films (Transparent conductive films) are brought into contact by a touch pressure. However, the resistance film type touch sensor has drawbacks in that the touch sensor or the display device is susceptible to the touch pressure, and transmissivity is low due to an optical scattering effect of an air layer between the resistance films.

The capacitive type touch sensor which can supplement the drawbacks of the resistance film type touch sensor perceives the touch by sensing a change of capacitance taken place as a small amount of charge moves to a touch point when a conductive body, such as a human body or the stylus, touches. The capacitive type touch sensor is paid attention since the capacitive type touch sensor has a long life time, high transmissivity, and an excellent touch sensing capability, and enables multiple touches owing to reinforced glass applied thereto.

In general, the touch sensor is fabricated as a panel attached to an upper side of the display device for performing a touch input function. However, the display device having the touch sensor attached thereto has a problem in that the touch sensor malfunctions due to a noise component from the display device.

In the meantime, if a liquid crystal display device is used as the display device, the liquid crystal display device is operative in a TN (Twisted Nematic) mode, or a VA (Vertical Alignment) mode, which uses a vertical electric field, or an IPS (In-Plane Switching) mode or an FFS (Fringe Field Switching) mode, which uses a horizontal electric field.

The TN mode, or the VA mode liquid crystal display device which uses the vertical electric field has a common electrode formed throughout an upper substrate for shielding the noise from the liquid crystal display device. Opposite to this, since the IPS mode or the FFS mode liquid crystal display device which uses the horizontal electric field has the common electrode formed on a lower substrate together with pixel electrodes, shielding of the noise infiltrating into the touch sensor from the liquid crystal display device is difficult.

SUMMARY OF THE DISCLOSURE

Accordingly, the present invention is directed to a display device and a method for driving the same.

An object of the present invention is to provide a display device having a touch sensor in which the touch sensor is driven in a period which has a small noise component from the display device to reduce influence from the noise for minimizing a touch error; and a method for driving the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device having a touch sensor includes a display panel, a panel driving unit for driving the display panel, a timing controller for controlling driving timing of the panel driving unit, a touch sensor integrated with the display panel attached thereto or built therein, and a touch controller for driving the touch sensor in a no noise period excluding a period in which the noise is generated periodically from the display panel by using at least one synchronizing signal from the timing controller, calculating touch coordinates from a signal from the touch sensor, and forwarding the touch coordinates.

The touch controller includes a readout circuit for generating a sensing data from the signal from the touch sensor, and forwarding the sensing data, a synchronizing signal input unit for receiving and forwarding at least one of a vertical synchronizing signal, a horizontal synchronizing signal, a source output enable signal and a gate output enable signal, a noise determining unit for counting the synchronizing signal from the synchronizing signal input unit, and detecting a period in which the noise is generated periodically with reference to the synchronizing signal to generates a noise determining signal which indicates the noise period and the no noise period, and a signal processor for calculating and forwarding the touch coordinates by using the sensing data from the readout circuit as well as driving the touch sensor in every periodic no noise period with reference to the noise determining signal from the noise determining unit.

In another aspect of the present invention, a display device having a touch sensor includes a display panel, a panel driving unit for driving the display panel, a timing controller for controlling driving timing of the panel driving unit, a touch sensor integrated with the display panel attached thereto or built therein, and a touch controller for generating a sensing data from a signal from the touch sensor, calculating touch coordinates from the sensing data, forwarding the touch coordinates, and driving the touch sensor in a no noise period excluding a periodic noise period with reference to a noise component in the sensing data.

The touch controller includes a readout circuit for generating and forwarding a sensing data signal by using a signal from the touch sensor, a noise filter for detecting a noise component from the sensing data from the readout circuit, and forwarding the noise component as a noise detection signal, a noise determining unit for determining whether the noise detection signal from the noise filter is periodic or not by using at least one synchronizing signal from the timing controller, and forwarding a noise determining signal which indicates a periodic noise period and a no noise period, and a signal processor for calculating and forwarding the touch coordinates by using a sensing data from the readout circuit as well as driving the touch sensor in every periodic no noise period with reference to the noise determining signal from the noise determining unit.

In another aspect of the present invention, a display device having a touch sensor includes a display panel, a panel driving unit for driving the display panel, a common voltage generator for generating a common voltage, and supplying the common voltage to the display panel, a timing controller for controlling driving timing of the panel driving unit, a touch sensor integrated with the display panel attached thereto or built therein, and a touch controller for generating a sensing data from a signal from the touch sensor, calculating a touch coordinates from the sensing data, and forwarding the touch coordinates, as well as driving the touch sensor in a no noise period excluding a periodic noise period with reference to a noise component of a common voltage fed back thereto from the display panel through the common voltage generator.

The touch controller includes a readout circuit for generating a sensing data from a signal from the touch sensor and forwarding the sensing data, a noise determining unit for detecting a noise component of the common voltage fed back thereto from the common voltage generator, and forwarding a noise determining signal which indicates a periodic noise period and no noise period in response to the noise detection signal, and a signal processor for generating and forwarding the touch coordinates by using the sensing data from the readout circuit as well as driving the touch sensor in every periodic no noise period with reference to the noise determining signal from the noise determining unit.

The periodic noise period varies with resolution and an operation temperature of the display panel.

In another aspect of the present invention, a method for driving a display device having a touch sensor includes the steps of driving a display panel, and driving the touch sensor in a no noise period excluding a period in which the noise is generated periodically from the display panel by using at least one synchronizing signal which controls driving timing of the display panel.

The step of driving the touch sensor includes the steps of receiving at least one of a vertical synchronizing signal, a horizontal synchronizing signal, and a gate output enable signal for controlling driving timing of the display panel, counting the synchronizing signal for detecting a period in which the noise is generated periodically with reference to the synchronizing signal to generates a noise determining signal which indicates the noise period and the no noise period, and driving the touch sensor in every periodic no noise period with reference to the noise determining signal.

In another aspect of the present invention, a method for driving a display device having a touch sensor includes the steps of driving a display panel, and generating a sensing data from a signal from the touch sensor, and driving the touch sensor in a no noise period excluding a periodic noise period with reference to a noise component in the sensing data.

The step of driving the touch sensor includes the steps of detecting a noise component from the sensing data, and forwarding a noise detection signal, determining whether the noise detection signal is periodic or not by using at least one synchronizing signal which controls driving timing of the display panel, and forwarding a noise determining signal which indicates a periodic noise period and a no noise period, and driving the touch sensor in every periodic no noise period with reference to the noise determining signal from the noise determining unit.

In another aspect of the present invention, a method for driving a display device having a touch sensor includes the steps of driving a display panel, and driving the touch sensor in a no noise period excluding a periodic noise period with reference to a noise component of a common voltage fed back thereto from the display panel.

The step of driving the touch sensor includes the steps of detecting a noise component of the common voltage fed back thereto, and forwarding a noise determining signal which indicates a periodic noise period and no noise period in response to the noise detection signal, and driving the touch sensor in every periodic no noise period with reference to the noise determining signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
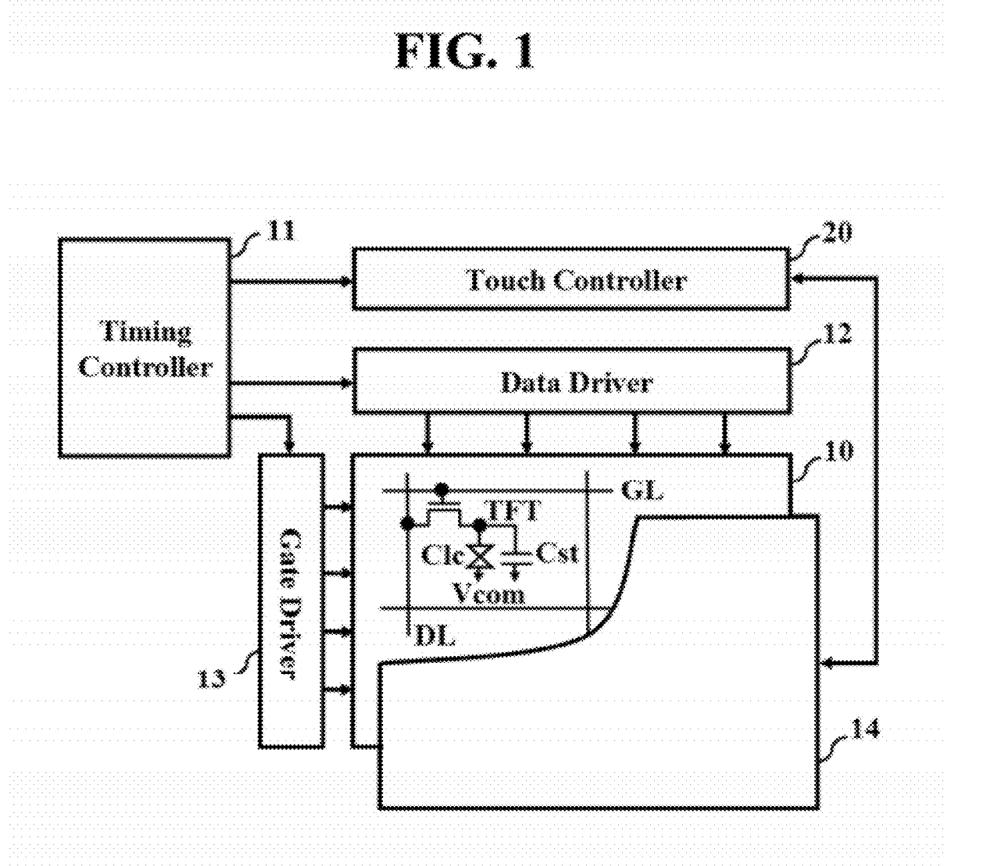
FIG. 1 illustrates a block diagram of a driving unit of a display device having a touch sensor in accordance with a preferred embodiment of the present invention, schematically.

FIG. 1 illustrates a block diagram of a driving unit of a display device having a touch sensor in accordance with a preferred embodiment of the present invention, schematically.

Referring to FIG. 1, the driving unit of a display device having a touch sensor includes a touch controller 20 for driving a touch sensor 14, a data driver 12 and a gate driver 13 for driving a display panel 10, and a timing controller 11 for driving a panel driving unit including the data driver 12 and the gate driver 13. In this instance, the touch controller 20 can be integrated as one integrated circuit built in the timing controller 11.

As the display panel 10, a flat display panel, such as a liquid crystal display panel (Hereafter, a liquid crystal panel), a plasma display panel, or an organic luminescence diode display panel, can be used, mostly. The display panel 10 will be described taking the liquid crystal panel as an example. If the liquid crystal panel is used as the display panel 10, the display panel 10 includes a color filter substrate having a color filter array formed thereon, a thin film transistor array substrate having a thin film transistor array formed thereon, a liquid crystal layer between the color filter substrate and the thin film transistor array substrate, and a polarizing plate attached to an outside of each of the color filter substrate and the thin film transistor array substrate. The display panel 10 displays an image by means of a pixel matrix having a plurality of pixels arranged thereon. Each of the pixels produces a desired color by a combination of red, green, and blue sub-pixels each of which varies an orientation of the liquid crystals according to a data signal to adjust light transmissivity. Each of the sub-pixels has a thin film transistor TFT connected to a gate line GL and a data line DL, a liquid crystal capacitor Clc and a storage capacitor Cst connected to the thin film transistor TFT in parallel. The liquid crystal capacitor Clc charges a difference between the data signal supplied to the pixel electrode through the thin film transistor TFT and a common voltage Vcom supplied to the common electrode therein, and drives the liquid crystals according to the voltage charged thus to adjust light transmissivity. The storage capacitor Cst sustains the voltage charged in the liquid crystal capacitor Clc.

The timing controller 11 performs various signal processes using an image data from an external host system (Not shown) and supplies the processed data to the data driver 12. For an example, in order to improve a response speed of the liquid crystals, the timing controller 11 can correct a data by overdriving in which an overshoot value or an undershoot value is added depending on a data difference between adjacent frames and forwards the data corrected thus. And, the timing controller 11 generates a data control signal which controls driving timing of the data driver 12 and a gate control signal which controls driving timing of the gate driver 13 by using a plurality of synchronizing signals from the host system (Not shown), and forwards the data control signal and the gate control signal to the data driver 12 and the gate driver 13 respectively. The data control signal includes a source start pulse and source sampling clock which control latching of the data signal, a polarity control signal for controlling a polarity of the data signal, and a source output enable signal which controls an output period of the data signal. The gate control signal includes a gate start pulse and a gate shift clock which control scanning of the gate signal, a gate output enable signal which controls an output period of the gate signal. And, the timing controller 11 forwards synchronizing signals (Vertical synchronizing signal Vsync and Horizontal synchronizing signal Hsync), the source output enable signal SOE or a gate output enable signal GOE to the touch controller 20.

Figure 3:
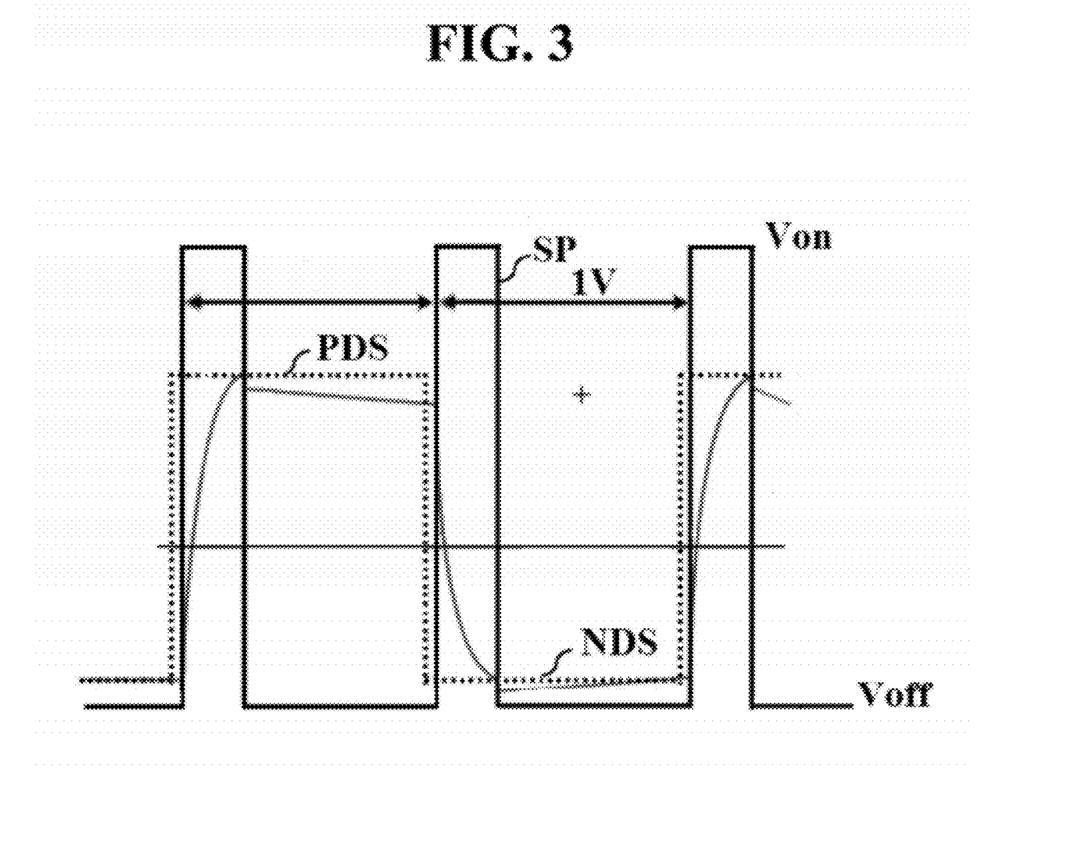
FIG. 3 illustrates a driving wave form of the display panel in FIG. 1.

The gate driver 13 drives the plurality of gate lines GL formed at the thin film transistor array of the liquid crystal panel 10 in response to the gate control signal from the timing controller 11, in succession. As shown in FIG. 3, the gate driver 13 supplies the scan pulse of the gate on voltage at every scan period of the gate lines GL, and a gate off voltage in the other periods in which other gate line GL is driven. In this instance, a width of the scan pulse in which the gate on voltage is supplied is controlled by the gate output enable signal GOE from the timing controller 11.

The data driver 12 supplies the data signal to the plurality of data lines DL formed at the thin film transistor array of the display panel 10 in response to the data control signal from the timing controller 11. The data driver 12 receives and converts a digital data into a positive/negative analog data signal by using a gamma voltage and supplies the data signal to the data line DL every time the gate line GL is driven.

Figure 2:
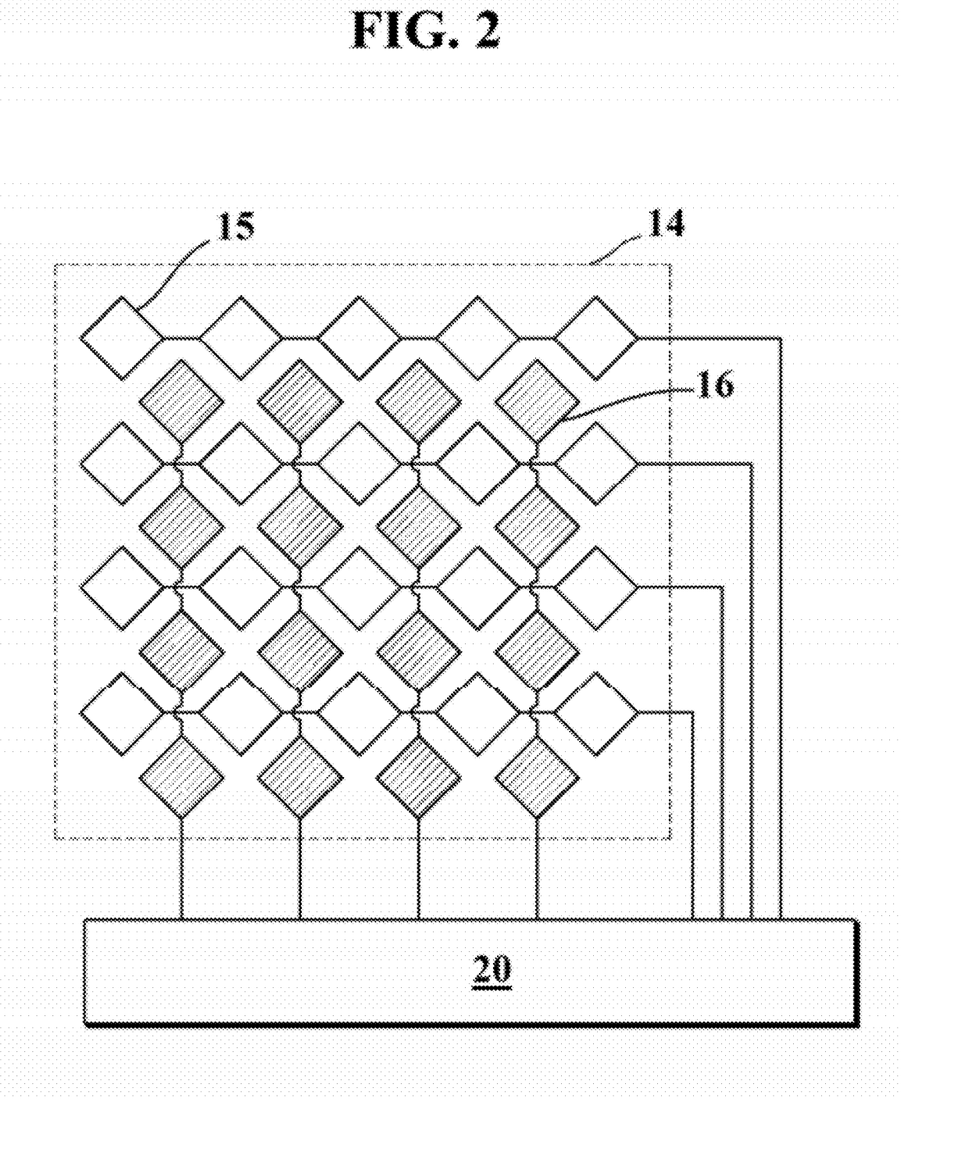
FIG. 2 illustrates a schematic view of an example of the touch sensor in FIG. 1.

The touch sensor 14 is a capacitive type touch sensor which senses a change of capacitance taken place as a small amount of charge moves to a touch point when a conductive body, such as a human body or a stylus, touches the touch sensor 14. The touch sensor 14 can be attached to the display panel 10 or built in the pixel array of the display panel 10. As shown in FIG. 2, the capacitive type touch sensor 14 has a plurality of first sensing electrodes 15 arranged in a row direction, and a plurality of second sensing electrode 16 arranged in a column direction. The first sensing electrodes 15 arranged in the row direction are connected to one another electrically, and the second sensing electrodes 16 arranged in the column direction are connected to one another electrically. In most of cases, the first and second sensing electrodes 15 and 16 can have, but not limited to, diamond shapes. The first and second sensing electrodes 15 and 16 are driven by the touch controller 20, and form a capacitor with a conductive touch body which touches the touch sensor 14 to change capacitance, thereby forwarding a signal which indicates whether a touch is made or not.

The touch controller 20 supplies a driving signal to the touch sensor 14 as well as senses the touch with reference to a signal from the touch sensor 14 to generate a sensing data, calculates touch coordinates from the sensing data, and supplies the touch coordinates to the host system (Nor shown). And, the touch controller 20 detects a period in which the noise is small from the display panel 10, i.e., a no noise period, by using the synchronizing signal Vsync or Hsync, the source output enable signal SOE or the gate output enable signal GOE from the timing controller 11, and drives the touch sensor 14 in the no noise period detected thus. Different from this, the touch controller 20 can detect the no noise period by using the signal from the touch sensor 14, and drive the touch sensor 14 in the no noise period detected thus. The noise period and the no noise period can vary with resolution and an operation temperature.

Figure 4:
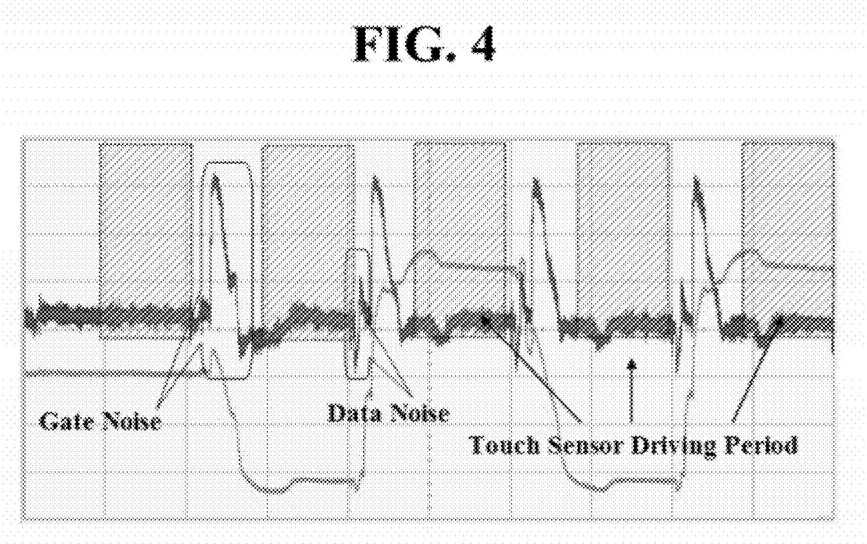
FIG. 4 illustrates a wave form of a noise component of the display panel in FIG. 1.
Figure 5:
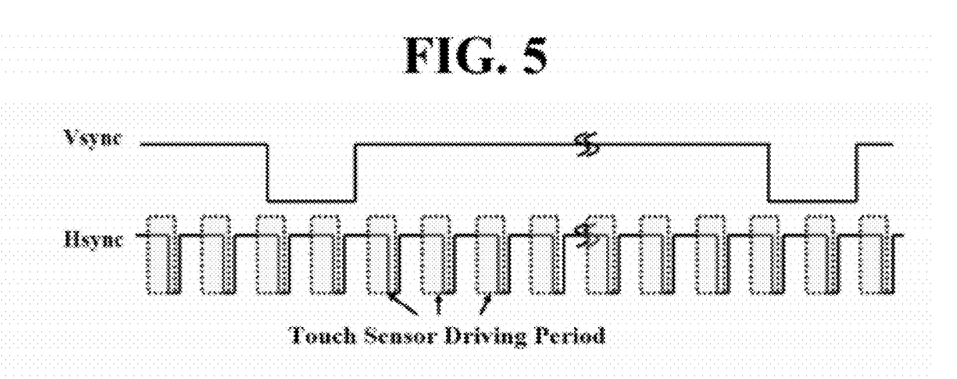
FIG. 5 illustrates a driving wave form of a touch sensor in accordance with a preferred embodiment of the present invention.

Referring to FIGS. 3 to 5, it can be known that, in the display panel 10, the noise is mostly generated in pixel charging and discharging time periods through the thin film transistor in a turned-on period of the thin film transistor by the gate on voltage.

Referring to FIG. 3, each of the thin film transistors in the display panel 10 supplies a positive data signal PDS and a negative data signal NDS with reference to the common voltage Vcom to each of the pixels at every one vertical synchronizing period 1V alternately in response to a gate pulse GP of the gate on voltage.

Referring to FIG. 4, it can be known that the noise component is generated periodically in every charging and discharging time periods (a rising and falling time periods) of the data signal in a gate pulse GP turn-on period. Therefore, the present invention suggests sensing the periodic noise of the display panel 10 to drive the touch sensor in the no noise period excluding the noise period, thereby reducing influence from the noise.

Referring to FIG. 5, the touch controller 20 senses the periodic noise period by using the vertical synchronizing signal Vsync and the horizontal synchronizing signal Hsync from the timing controller 11, and generates the driving signal for driving the touch sensor in the no noise period excluding the noise period.

Different from this, the touch controller 20 can sense the periodic noise period by using the gate output enable signal GOE from the timing controller 11, or by using the signal from the touch sensor 14 for driving the touch sensor 14 in the no noise period excluding the noise period.

Figure 6:
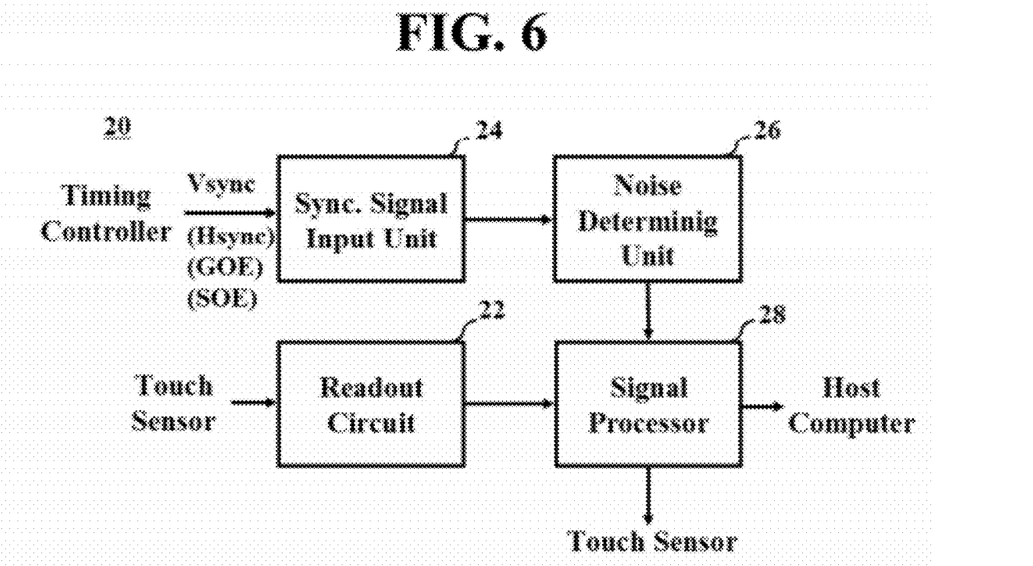
FIG. 6 illustrates an inside block diagram of the touch controller in FIG. 1 in accordance with a preferred embodiment of the present invention.

FIG. 6 illustrates a block diagram of the touch controller 20 in FIG. 1 in accordance with a preferred embodiment of the present invention.

Referring to FIG. 6, the touch controller 20 includes a readout circuit 22, a synchronizing signal input unit 24, a noise determining unit 26, and a signal processor 28.

The readout circuit 22 generates a sensing data signal by using the signal from the touch sensor 14 in FIG. 1. The readout circuit 22 compares the signal from the touch sensor 14 to a preset reference voltage to generate a sensing signal which indicates whether the touch is made or not, converts the sensing signal into a digital sensing data, and forwards the same.

The synchronizing signal input unit 24 receives the vertical synchronizing signal Vsync, the horizontal synchronizing signal Hsync, the source output enable signal SOE or the gate output enable signal GOE from the timing controller 11 in FIG. 1, and forwards the same to the noise determining unit 26.

The noise determining unit 26 counts at least one of the vertical synchronizing signal Vsync, the horizontal synchronizing signal Hsync, the source output enable signal SOE and the gate output enable signal GOE from the synchronizing signal input unit 24, and generates the noise determining signal which indicates the periodic noise period and the periodic no noise period as described before. In this instance, a counted value of the noise determining unit 26, i.e., the noise period and the no noise period can vary with the resolution and the operation temperature of the display panel 10.

The signal processor 28 drives the touch sensor 14 in the no noise period by using the noise determining signal from the noise determining unit 26. And, the signal processor 28 combines the sensing data from the readout circuit 22 to generate and forward the touch coordinates to the host system.

Figure 7:
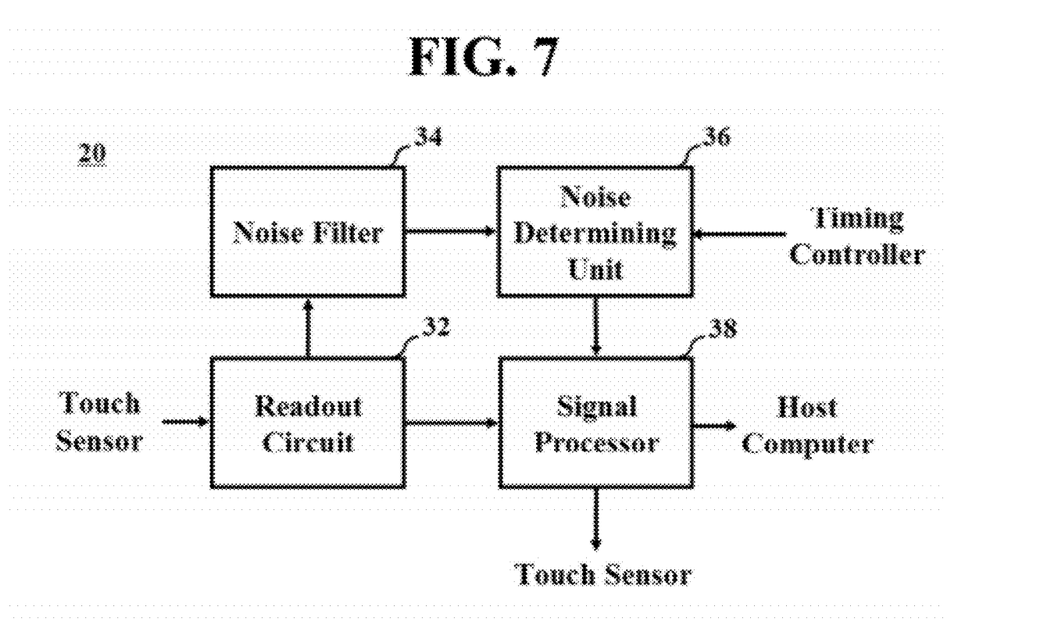
FIG. 7 illustrates an inside block diagram of the touch controller in FIG. 1 in accordance with another preferred embodiment of the present invention.

FIG. 7 illustrates an inside block diagram of the touch controller 20 in FIG. 1 in accordance with another preferred embodiment of the present invention.

Referring to FIG. 7, the touch controller 20 includes a readout circuit 32, a noise filter 34, a noise determining unit 36, and a signal processor 38.

The readout circuit 32 generates a sensing data signal by using a signal from the touch sensor 14 in FIG. 1. The readout circuit 32 compares the signal from the touch sensor 14 to a preset reference voltage to generate a signal indicating whether the touch is made or not, and converts the sensing signal to a digital sensing data and forwards the same.

The noise filter 34 detects a noise component from the sensing data from the readout circuit 32, and forwards a noise detection signal.

The noise determining unit 36 determines whether the noise detection signal from the noise filter 34 is the periodic noise which is generated periodically or not by using the synchronizing signals Vsync and Hsync from the timing controller 11, and, if determined to be the periodic noise signal generated synchronized to the synchronizing signals Vsync and Hsync, forwards the noise determining signal which indicates the periodic noise generating period.

The signal processor 38 drives the touch sensor 14 in the no noise period by using the noise determining signal from the noise determining unit 36. And, the signal processor 38 combines the sensing data from the readout circuit 32 to generate touch coordinates, and forwards the touch coordinates to the host system.

Figure 8:
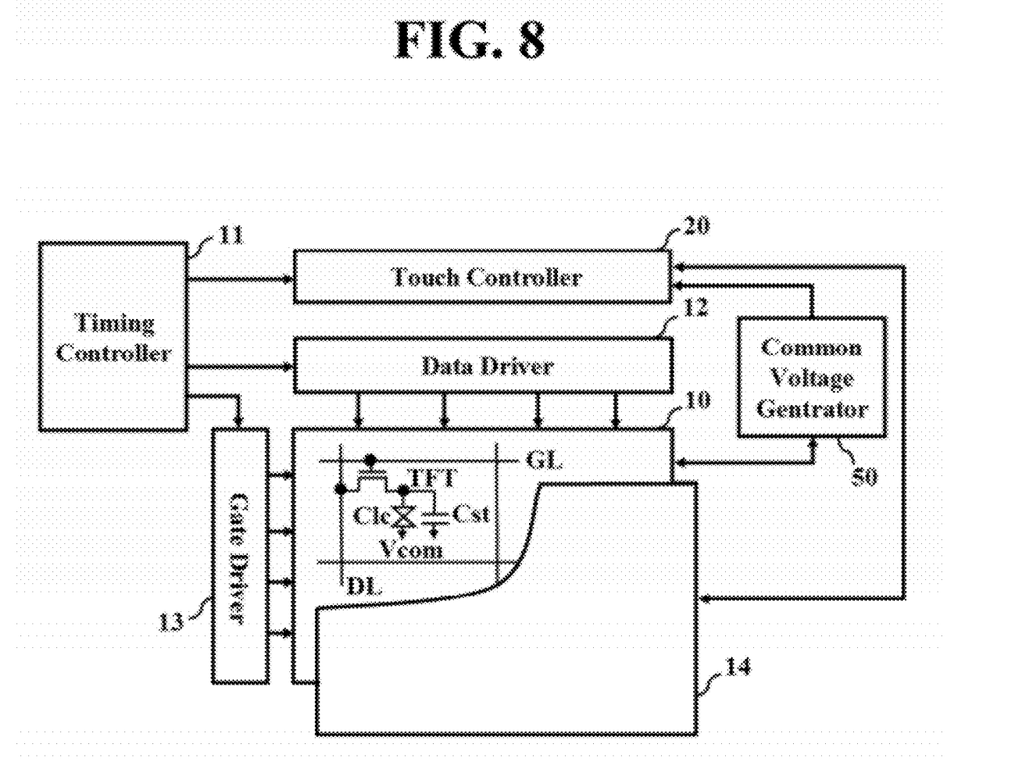
FIG. 8 illustrates a block diagram of a driving unit of a display device having a touch sensor in accordance with another preferred embodiment of the present invention, schematically.

FIG. 8 illustrates a block diagram of a driving unit of a display device having a touch sensor in accordance with another preferred embodiment of the present invention, schematically.

Referring to FIG. 8, the driving unit of a display device having a touch sensor includes a touch controller 40 for driving a touch sensor 14, a data driver 12 and a gate driver 13 for driving a display panel 10, a timing controller 11 for driving a panel driving unit including the data driver 12 and the gate driver 13, and a common voltage generator 50 for supplying a common voltage Vcom to the display panel 10. In this instance, the touch controller 40 can be integrated as one integrated circuit built in the timing controller 11.

In comparison to the display device having the touch sensor in FIG. 1, since the display device having the touch sensor in FIG. 8 is different in that the touch controller 40 determines a noise period by using a common voltage signal fed back thereto from the display panel 10 through the common voltage generator 50, description of repetitive elements will be omitted.

Figure 9:
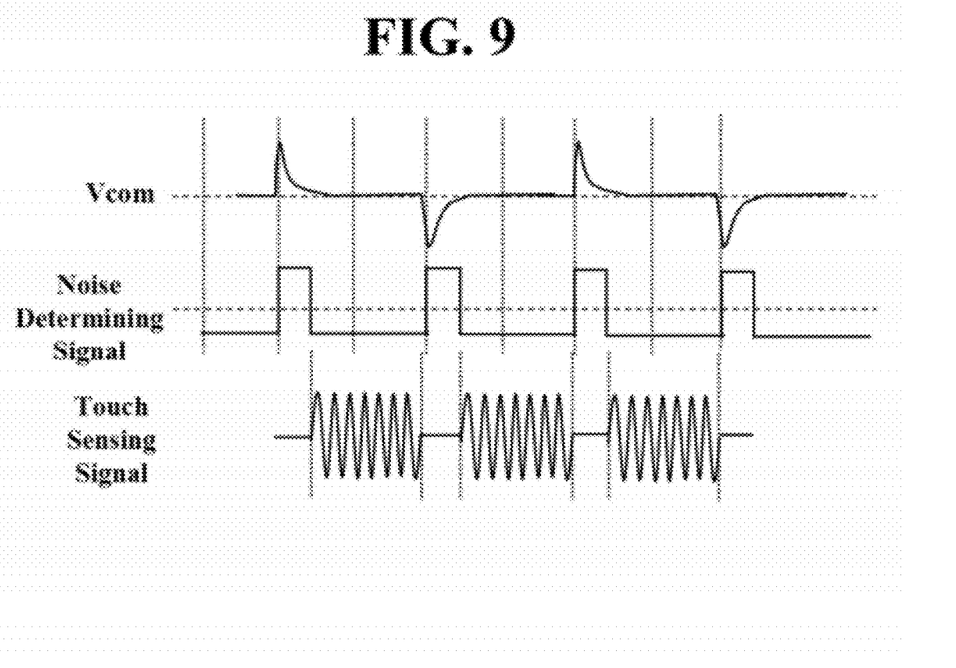
FIG. 9 illustrates a driving wave form of the touch controller in FIG. 8.

The common voltage generator 50 generates the common voltage Vcom and supplies the common voltage Vcom to a common electrode of the display panel 10. In this instance, as shown in FIG. 9, the common voltage generator 50 compensates the common voltage Vcom by using the common voltage Vcom signal fed back thereto from the common electrode of the display panel 10, and forwards the common voltage Vcom compensated thus. As shown in FIG. 9, a ripple component is generated in the common voltage Vcom of the display panel 10, which ripples in a direction of a positive polarity or a negative polarity according to a data signal every time a positive polarity data signal or a negative polarity data signal is supplied to the data line. The ripple component of the common voltage Vcom affects the touch sensor 14 as a noise component.

The touch controller 40 supplies a driving signal to the touch sensor 14 as well as senses the touch with reference to a signal from the touch sensor 14 to generate a sensing data, calculates touch coordinates from the sensing data, and supplies the touch coordinates to the host system (Nor shown). And, the touch controller 40 determines a period in which the ripple component is generated by using the common voltage Vcom fed back thereto from the common voltage generator 50, and drives the touch sensor 14 in a no noise period excluding the noise period.

Figure 10:
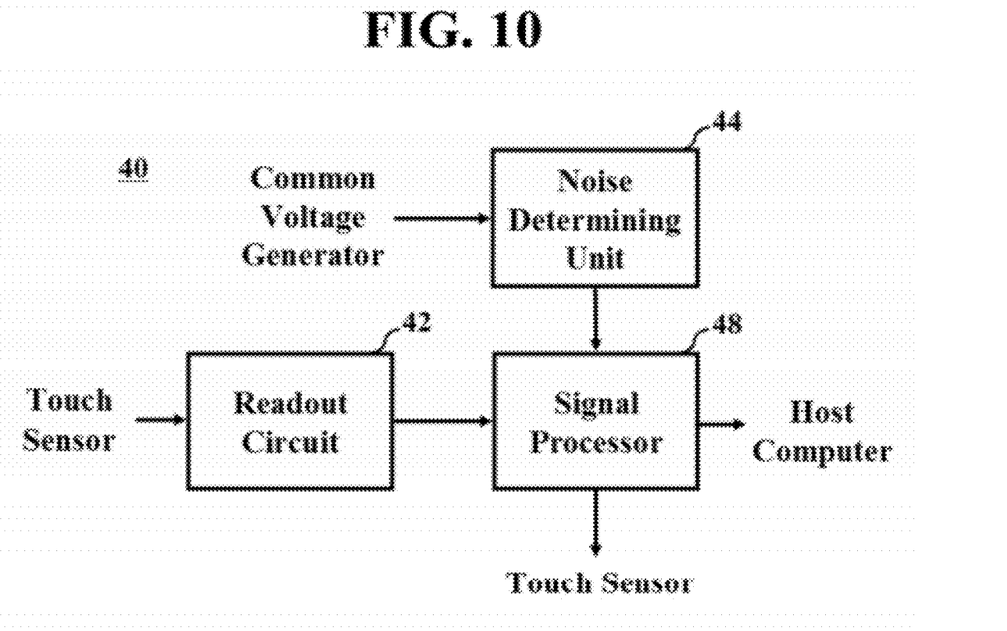
FIG. 10 illustrates an inside block diagram of the touch controller in FIG. 8.

Referring to FIG. 10, to do this, the touch controller 40 includes a readout circuit 42, a noise determining unit 44, and a signal processor 48.

The readout circuit 42 generates a sensing data signal by using the signal from the touch sensor 14 in FIG. 8. The readout circuit 42 compares the signal from the touch sensor 14 to a preset reference voltage to generate a sensing signal which indicates whether the touch is made or not, converts the sensing signal into a digital sensing data, and forwards the same.

Referring to FIG. 9, the noise determining unit 44 detects the ripple component, i.e., the noise component, of the common voltage Vcom fed back thereto from the common voltage generator 50, and forwards a noise determining signal which indicates a period in which the noise component is generated.

The signal processor 48 drives the touch sensor 14 in the no noise period by using the noise determining signal from the noise determining unit 44. And, the signal processor 48 combines the sensing data from the readout circuit 42 to generate and forward the touch coordinates to the host system.

Figure 11A:
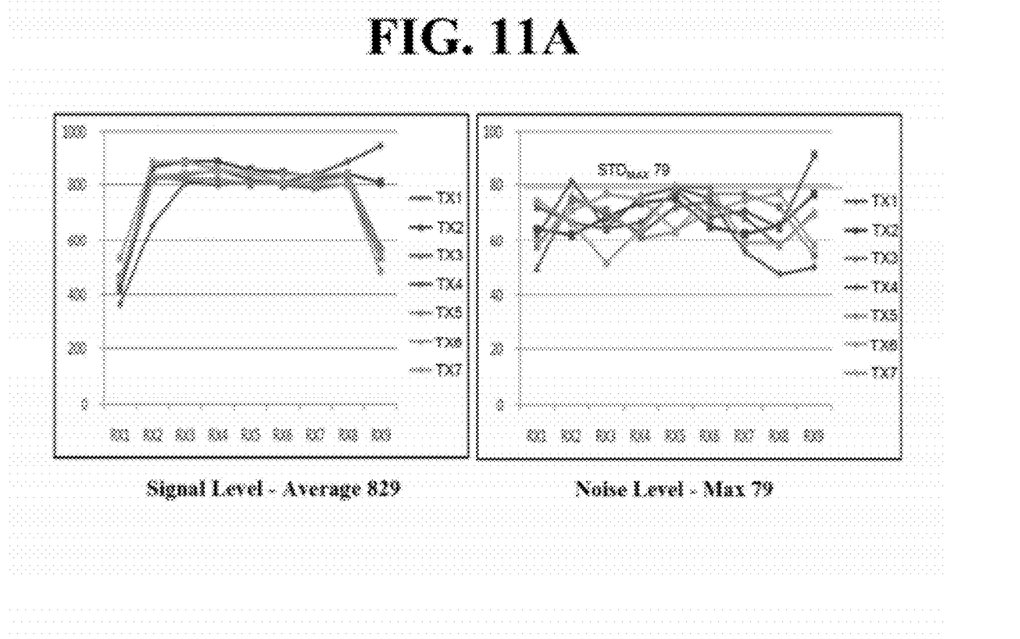
FIGS. 11A and 11B illustrate comparative graphs showing signal levels and noise levels in the related art and the present invention, respectively.
Figure 11B:
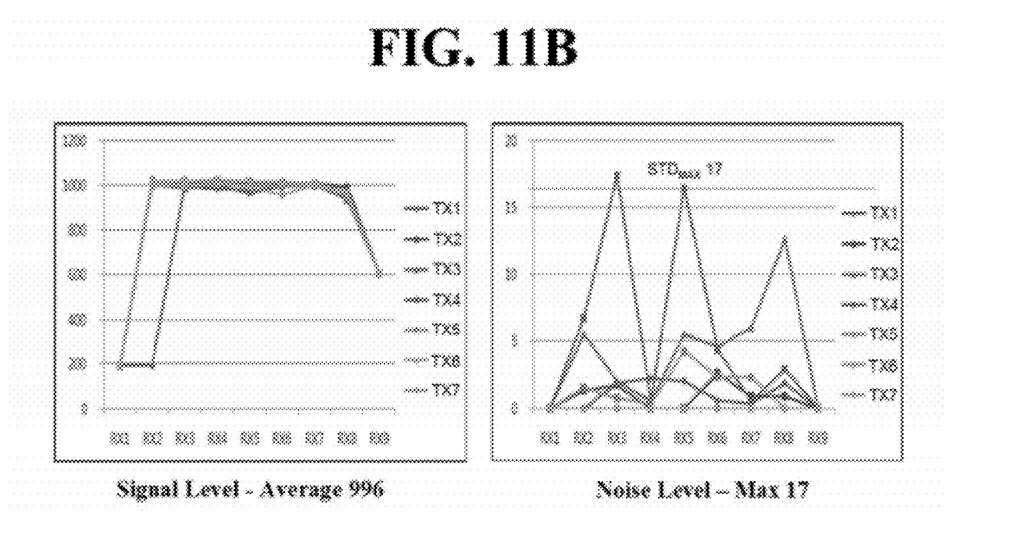

FIGS. 11A and 11B illustrate comparative graphs showing signal levels and noise levels of sensing data from the readout circuits in the touch controllers in the related art and the present invention, respectively.

Referring to FIGS. 11A and 11B, it can be known that, since the sensing data from the readout circuit of the related art touch controller has an average signal level of 829, a maximum noise level of 79, and high noise levels mostly to have a low signal to noise ratio (SNR) low, sensing sensitivity is low in the related art.

Opposite to this, referring to FIG. 11B, the sensing data from the readout circuit of the touch controller of the present invention to which a method is applied, in which the touch sensor is driven in the no noise period of the display panel, has an average signal level of 996, a maximum noise level of the sensing data is 17, and low noise levels mostly, to have a signal to noise ratio (SNR) to be higher than the related art, sensing sensitivity is high in the present invention.

The following table 1 shows the average output values of the sensing data from the readout circuits of the related art touch controller and the touch controller of the present invention for different inversion systems of the liquid crystal display device.

TABLE 1

| | | Average output data from Readout circuit | | |
|---|---|---|---|---|
| | Inversion Type | Signal Level | Noise Level | SNR |
| Related Art | Column Inversion | 65.6 | 24 | 2.73 |
| | Dot Inversion | 44.7 | 25 | 1.79 |
| The Present Invention | Column Inversion | 62.3 | 5.3 | 11.75 |
| | Dot Inversion | 44.5 | 4.7 | 9.47 |

Referring to table 1, in a case the display panel is driven by the column inversion or the dot inversion, it can be known that, while the related art touch controller has a relatively small signal to noise ratio SNR of the average data from the readout circuit of the related art touch controller to have low sensing sensitivity, the touch controller of the present invention has a high signal to noise ratio SNR of the average data from the readout circuit of the present invention to have high sensing sensitivity.

As have been described, the display device having a touch sensor and the method for driving the same of the present invention have the following advantages.

The sensing of the noise period periodically generated at the display panel by using at least one synchronizing signal (vertical synchronizing signal, a horizontal synchronizing signal, a source output enable signal and a gate output enable signal) from the timing controller of the display device, and driving the touch sensor in the no noise period excluding the noise period permits to reduce influence from the noise from the display panel.

The sensing of the noise period periodically generated at the display panel by using the common voltage signal fed back from the liquid crystal display panel, and driving the touch sensor in the no noise period excluding the noise period permits to reduce influence from the noise from the display panel.

Eventually, since the noise component entering into the touch controller is reduced by reducing the influence of noise from the display panel, to increase the signal to noise ratio, the present invention can improve sensing sensitivity.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device having a touch sensor, comprising:
    a display panel;
    a panel driving unit configured to drive the display panel;
    a timing controller configured to control driving timing of the panel driving unit;
    a touch sensor integrated with the display panel attached thereto or built therein; and
    a touch controller configured to:
        drive the touch sensor in a no noise period, excluding a period in which the noise is generated periodically from the display panel, by using at least two synchronizing signals from the timing controller, the no noise period beginning in between successive horizontal synchronizing signals and ending while a later of the successive horizontal synchronizing signals is active;
        calculate touch coordinates from a signal from the touch sensor;
        forward the touch coordinates; and
        indicate the no noise period by counting at least one of: a horizontal synchronizing signal, a source output enable signal, and a gate output enable signal.

2. The display device according to claim 1, wherein the touch controller comprises:
    a readout circuit configured to:
        generate a sensing data from the signal from the touch sensor; and
        forward the sensing data;
    a synchronizing signal input unit configured to receive and forward the synchronizing signals and the at least one of: the horizontal synchronizing signal, the source output enable signal and the gate output enable signal,
    a noise determining unit configured to:
        count the synchronizing signal from the synchronizing signal input unit; and detect a period in which the noise is generated periodically with reference to the synchronizing signal to generate a noise determining signal indicating the noise period and the no noise period; and a signal processor configured to:
calculate and forward the touch coordinates by using the sensing data from the readout circuit; and
drive the touch sensor in every periodic no noise period with reference to the noise determining signal from the noise determining unit.

3. The display device according to claim 1, wherein the periodic noise period varies with resolution and an operation temperature of the display panel.

4. A display device having a touch sensor, comprising:
a display panel;
a panel driving unit configured to drive the display panel;
a timing controller configured to control driving timing of the panel driving unit;
a touch sensor integrated with the display panel attached thereto or built therein; and
a touch controller configured to:
generate a sensing data from a signal from the touch sensor;
calculate touch coordinates from the sensing data;
forward the touch coordinates; and
drive the touch sensor in a no noise period, excluding a periodic noise period, with reference to a noise component in the sensing data, the no noise period beginning in between successive horizontal synchronizing signals and ending while a later of the successive horizontal synchronizing signals is active.

5. The display device according to claim 4, wherein the touch controller comprises:
a readout circuit configured to generate and forward a sensing data signal by using a signal from the touch sensor;
a noise filter configured to:
detect a noise component from the sensing data from the readout circuit; and
forward the noise component as a noise detection signal;
a noise determining unit configured to:
determine whether the noise detection signal from the noise filter is periodic or not by using at least synchronizing signals from the timing controller; and
forward a noise determining signal indicating a periodic noise period and a no noise period; and
a signal processor configured to:
calculate and forward the touch coordinates by using a sensing data from the readout circuit; and
drive the touch sensor in every periodic no noise period with reference to the noise determining signal from the noise determining unit.

6. The display device according to in claim 4, wherein the periodic noise period varies with resolution and an operation temperature of the display panel.

7. A display device having a touch sensor, comprising:
a display panel;
a panel driving unit configured to drive the display panel;
a common voltage generator configured to:
generate a common voltage; and
supply the common voltage to the display panel;
a timing controller configured to control driving timing of the panel driving unit;
a touch sensor integrated with the display panel attached thereto or built therein; and
a touch controller configured to:
generate a sensing data from a signal from the touch sensor;
calculate a touch coordinates from the sensing data;
forward the touch coordinates; and
drive the touch sensor in a no noise period, excluding a periodic noise period, with reference to a noise component of a common voltage fed back thereto from the display panel through the common voltage generator, the no noise period beginning in between successive horizontal synchronizing signals and ending while a later of the successive horizontal synchronizing signals is active.

8. The display device according to claim 7, wherein the touch controller comprises:
a readout circuit configured to:
detect a sensing data from a signal from the touch sensor; and
forward the sensing data;
a noise determining unit configured to:
detect a noise component of the common voltage fed back thereto from the common voltage generator; and
forward a noise determining signal indicating a periodic noise period and no noise period in response to the noise detection signal; and
a signal processor configured to:
generate and forward the touch coordinates by using the sensing data from the readout circuit; and
drive the touch sensor in every periodic no noise period with reference to the noise determining signal from the noise determining unit.

9. The display device according to claim 7, wherein the periodic noise period varies with resolution and an operation temperature of the display panel.

10. A method for driving a display device having a touch sensor, the method comprising:
driving a display panel; and
driving the touch sensor in a no noise period, excluding a period in which the noise is generated periodically from the display panel, by using at least two synchronizing signals controlling driving timing of the display panel,
wherein the no noise period begins in between successive horizontal synchronizing signals and ends while a later of the successive horizontal synchronizing signals is active, and
wherein the no noise period is indicated by counting at least one of: a horizontal synchronizing signal, a source output enable signal, and a gate output enable signal.

11. The method according to claim 10, wherein the driving the touch sensor comprises:
receiving the at least one of the horizontal synchronizing signal, the source output enable signal, and the gate output enable signal for controlling driving timing of the display panel;
counting the synchronizing signal for detecting a period in which the noise is generated periodically with reference to the synchronizing signal to generate a noise determining signal indicating the noise period and the no noise period; and
driving the touch sensor in every periodic no noise period with reference to the noise determining signal.

12. A method for driving a display device having a touch sensor, the method comprising:
driving a display panel;
generating a sensing data from a signal from the touch sensor; and driving the touch sensor in a no noise period, excluding a periodic noise period, with reference to a noise component in the sensing data, the no noise period beginning in between successive horizontal synchronizing signals and ending while a later of the successive horizontal synchronizing signals is active.

13. The method according to claim 12, wherein the driving the touch sensor comprises:
detecting a noise component from the sensing data;
forwarding a noise detection signal;
determining whether the noise detection signal is periodic or not by using at least two synchronizing signals controlling driving timing of the display panel;
forwarding a noise determining signal indicating a periodic noise period and a no noise period; and
driving the touch sensor in every periodic no noise period with reference to the noise determining signal from the noise determining unit.

14. A method for driving a display device having a touch sensor, the method comprising:
driving a display panel; and
driving the touch sensor in a no noise period, excluding a periodic noise period, with reference to a noise component of a common voltage fed back thereto from the display panel, the no noise period beginning in between successive horizontal synchronizing signals and ending while a later of the successive horizontal synchronizing signals is active.

15. The method according to claim 14, wherein the driving the touch sensor comprises:
detecting a noise component of the common voltage fed back thereto;
forwarding a noise determining signal indicating a periodic noise period and no noise period in response to the noise detection signal; and
driving the touch sensor in every periodic no noise period with reference to the noise determining signal.

* * * * *